(12) United States Patent
Chen et al.

(10) Patent No.: US 9,791,173 B2
(45) Date of Patent: Oct. 17, 2017

(54) HEATING DEVICE HAVING HEATING TRANSISTOR UNIT

(71) Applicant: Sercomm Corporation, Taipei (TW)

(72) Inventors: Chien-Ming Chen, Taipei (TW); Meng-Chien Chiang, Taipei (TW)

(73) Assignee: Sercomm Corporation, Taipei (TW)

( * ) Notice: Subject to any disclaimer, the term of this patent is extended or adjusted under 35 U.S.C. 154(b) by 0 days.

(21) Appl. No.: 15/076,687

(22) Filed: Mar. 22, 2016

(65) Prior Publication Data

US 2017/0059209 A1 Mar. 2, 2017

(30) Foreign Application Priority Data

Aug. 24, 2015 (CN) .......................... 2015 1 0523698

(51) Int. Cl.
*H05B 1/02* (2006.01)
*F24H 9/20* (2006.01)
*F24H 3/00* (2006.01)
*F24D 13/00* (2006.01)

(52) U.S. Cl.
CPC ........... *F24H 9/2071* (2013.01); *F24D 13/00* (2013.01); *F24H 3/002* (2013.01)

(58) Field of Classification Search
CPC ........ F24H 9/0271; F24H 3/002; F24D 13/00; H05B 1/0269; H05B 1/0297; H05B 2203/035
USPC ........ 219/494, 497, 501, 504, 505, 209, 210
See application file for complete search history.

(56) References Cited

U.S. PATENT DOCUMENTS

| 3,028,473 | A | * | 4/1962 | Dyer | G05D 23/2401 |
| | | | | | 219/209 |
| 3,970,818 | A | * | 7/1976 | Friedrichs | G05D 23/1906 |
| | | | | | 219/210 |
| 5,508,126 | A | * | 4/1996 | Braun | E04C 2/34 |
| | | | | | 219/209 |
| 6,433,309 | B2 | * | 8/2002 | Hashimoto | G04F 5/04 |
| | | | | | 219/210 |

(Continued)

FOREIGN PATENT DOCUMENTS

CN 1936755 3/2007
CN 201252646 6/2009
(Continued)

OTHER PUBLICATIONS

"Office Action of China Counterpart Application," issued on May 15, 2017, p. 1-p. 8.

*Primary Examiner* — Mark Paschall
(74) *Attorney, Agent, or Firm* — Jianq Chyun IP Office

(57) ABSTRACT

A heating device is provided. A temperature sensing unit is configured to sense an ambient temperature and accordingly output a temperature sensing voltage. A driving unit is coupled to a heating transistor unit and the temperature sensing unit, and configured to drive the heating transistor unit for performing heating based on the temperature sensing voltage. An activating unit is coupled to the temperature sensing unit, configured to output an activating signal based on the temperature sensing voltage when a temperature of the printed circuit board has risen up to a preset temperature. The heating device as provided can assure that the activating signal can be normally outputted by the heating device under an ambient at an extremely low temperature.

11 Claims, 3 Drawing Sheets

(56) References Cited

U.S. PATENT DOCUMENTS

| | | | | |
|---|---|---|---|---|
| 9,012,810 | B2* | 4/2015 | Santoruvo | B01J 19/0093 |
| | | | | 219/209 |
| 2003/0038124 | A1* | 2/2003 | Krieger | B60R 16/0238 |
| | | | | 219/209 |
| 2012/0005469 | A1 | 1/2012 | Jeng et al. | |
| 2013/0008883 | A1* | 1/2013 | Arai | H03L 1/022 |
| | | | | 219/210 |

FOREIGN PATENT DOCUMENTS

| | | |
|---|---|---|
| CN | 102137584 | 7/2011 |
| CN | 102736647 | 10/2012 |
| CN | 203405744 | 1/2014 |
| CN | 203744366 | 7/2014 |
| CN | 204084544 | 1/2015 |
| CN | 104679063 | 6/2015 |

* cited by examiner

HEATING DEVICE HAVING HEATING TRANSISTOR UNIT

CROSS-REFERENCE TO RELATED APPLICATION

This application claims the priority benefit of China application serial no. 201510523698.X, filed on Aug. 24, 2015. The entirety of the above-mentioned patent application is hereby incorporated by reference herein and made a part of this specification.

BACKGROUND OF THE INVENTION

1. Field of the Invention

The present invention generally relates to an electronic apparatus, in particular, to a heating device.

2. Description of Related Art

In general, when the electronic apparatus is used, its ambient temperature as required for operation is about consisting with the living ambient temperature, without need of specific control on temperature. At most, a thermal dissipation device such as a fan may be additionally installed to allow the electronic apparatus to normally work. However, in some special areas or working environments, the temperature may be extremely low, such as −40° C. or less, resulting in that electronic apparatus cannot be normally activated. In this situation, the electronic apparatus needs to be first heated up to a certain temperature, and then electronic apparatus is activated, so as to assure the electronic apparatus to be normally turned on and working.

Usually, the heating device of electronic apparatus is controlled by the micro controller or the central processing unit. However, when the micro controller or the central processing unit is at extremely low temperature, abnormal situation may occur. In manufacture, a heater board may usually be configured to perform heating but the heater board has the disadvantage of high cost and this issue needs to be further solved.

SUMMARY

The invention provides a heating device, in which the production cost for the heating device can be reduced.

A heating device of the invention includes a heating transistor unit, a temperature sensing unit and a driving unit. The temperature sensing unit is configured to sense an ambient temperature and accordingly output a temperature sensing voltage. The driving unit is coupled to the heating transistor unit and the temperature sensing unit, and configured to drive the heating transistor unit to perform heating based on the temperature sensing voltage.

As to the foregoing descriptions, an embodiment of the invention uses the driving unit to drive the heating transistor unit to perform heating based on the temperature sensing voltage. By use of the heating transistor unit to perform heating, it can effectively reduce the production cost of the heating device. In another embodiment, the heating device can further have an activating unit. The activating unit outputs an activating signal based on the temperature sensing voltage when the driving unit drives the heating transistor unit to perform heating based on the temperature sensing voltage until a sensed temperature (for example, a sensed temperature of a printed circuit board or the ambient temperature) has risen to a preset temperature. Since the driving unit's low-temperature tolerance is higher than micro controller or central processing unit, it can be assured that the activating signal can be normally outputted by the heating device under an extremely low temperature.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
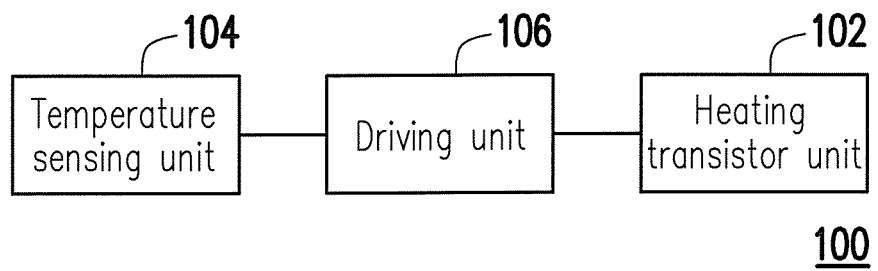
FIG. 1 is a drawing, schematically illustrating a heating device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a drawing, schematically illustrating a heating device according to an embodiment of the invention. Referring to FIG. 1, the heating device 100 includes a heating transistor unit 102, a temperature sensing unit 104 and a driving unit 106. The driving unit 106 is coupled to the heating transistor unit 102 and the temperature sensing unit 104. The temperature sensing unit 104 is configured to sense a temperature and output a temperature sensing voltage based on the sensing result. The driving unit 106 is configured to drive the heating transistor unit 102 based on the temperature sensing voltage to perform heating. The heating transistor unit 102 can be implemented by bipolar transistor as an example, such as PNP bipolar transistor, so that the heating transistor unit 102 replacing the heater board to server as the heating element can greatly reduce the production cost and decrease the layout space of the printed circuit board.

Figure 2:
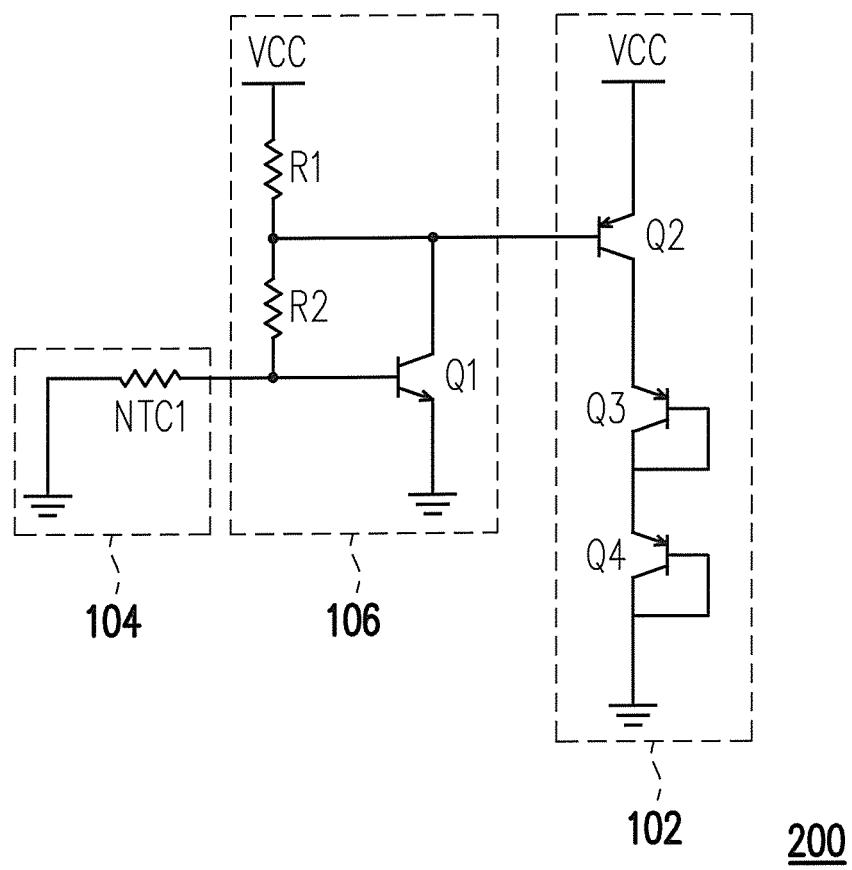
FIG. 2 is a drawing, schematically illustrating a heating device according to another embodiment of the invention.

FIG. 2 is a drawing, schematically illustrating a heating device according to another embodiment of the invention. Referring to FIG. 2, in detail, implementation of the heating transistor unit 102, the temperature sensing unit 104 and the driving unit 106 can be the way shown in FIG. 2. In the heating device 200, the temperature sensing unit 104 can be implemented by a negative temperature coefficient thermistor NTC1, which is coupled between the driving unit 106 and a ground. The driving unit 106 in the embodiment includes a NPN bipolar transistor Q1, a resistor R1 and a resistor R2. The resistor R1 is coupled in series with the resistor R2 between an operation voltage VCC and a base of the transistor Q1. A common connection node of the resistor R1 and the resistor R2 is coupled to a collector of the transistor Q1. An emitter of the transistor Q1 is coupled to the ground. In addition, the heating transistor unit 102 in an embodiment includes three PNP bipolar transistors Q2-Q4, coupled in series between the operation voltage VCC and the ground. The base of the transistor Q2 is coupled to the collector of the transistor Q1. The bases of the transistors Q2 and Q3 are coupled to their own collectors thereof, respectively.

When the ambient temperature is lower, the resistance of the thermistor NTC1 would be greater and the cross voltage of the thermistor NTC1 is larger. After proper design for the resistances of the resistor R1, the resistor R2 and the thermistor NTC1, the cross voltage of the thermistor NTC1 can conduct the transistor Q1 when ambient temperature has dropped to a preset value, such as −40° C. Then, voltage on the base of the transistor Q1 is increased, and further the voltage on the base of the transistor Q2 is drawn down to conduct the transistors Q2-Q4. The transistors Q2-Q4 as conducted can generate heat to bring up the temperature of the printed circuit board. As the transistors Q2-Q4 gradually bring up the temperature of the printed circuit board, the resistance of the thermistor NTC1 and the base voltage of the transistor Q1 are gradually dropping, and then the transistor Q1 is turned off. The transistors Q2-Q4 are also turned off, thereby, it can avoid the heating time being too long, which causes over-temperature or wasting power.

The heating transistor unit 102 of an embodiment includes three PNP bipolar transistors Q2-Q4, which can be respectively configured at different locations where the heating are needed, so to improve the heating effect. In an example, when the heating device 200 is applied to electronic apparatus, the PNP bipolar transistors Q2-Q4 can be respectively configured at the locations, at which nearby components of the electronic apparatus are poor for low-temperature tolerance, and then can assure the electronic apparatus to be normally turned on and working. In addition, since the PNP bipolar transistor serving as the heating element can be directly coupled to the ground, such as the transistor Q4, the PNP bipolar transistor as the heating element can transmit the thermal energy to the ground surface of the printed circuit board through grounding route, and then perform heating with better efficiency. The embodiment uses three PNP bipolar transistors Q2-Q4 as the example for description, however, the designer can determine the number of the PNP bipolar transistors according to the actual need.

Figure 3:
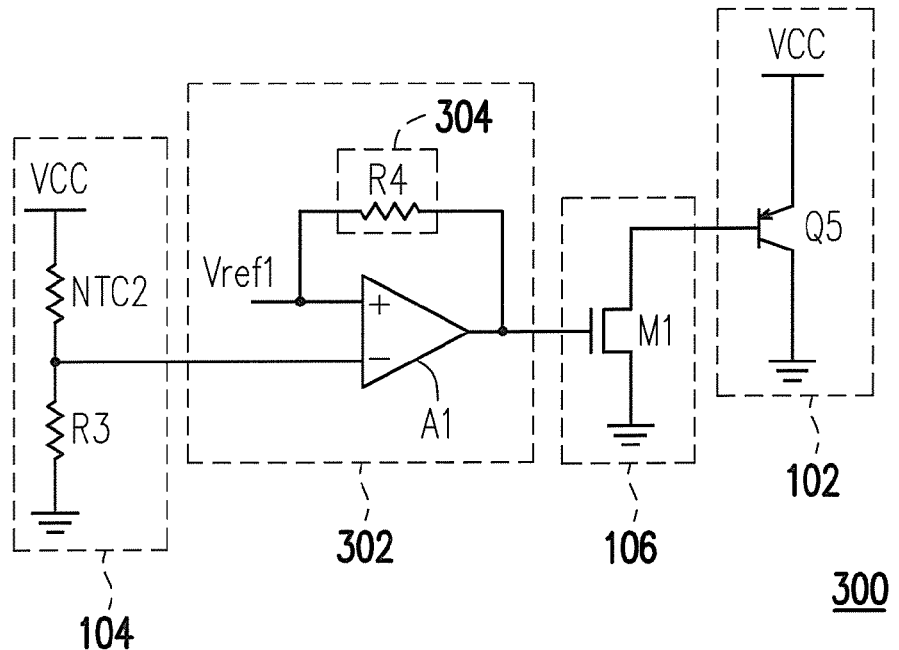
FIG. 3 is a drawing, schematically illustrating a heating device according to another embodiment of the invention.

FIG. 3 is a drawing, schematically illustrating a heating device according to another embodiment of the invention. Referring to FIG. 3, as comparing with the heating device 100 in FIG. 1, the heating device 300 can further include a hysteresis unit 302, coupled between the temperature sensing unit 104 and the driving unit 106. The hysteresis unit 302 can be configured to hysteresis the switch time for switching the voltage level of the temperature sensing voltage output from the temperature sensing unit 104, so to prevent the driving unit 106 from frequently switching the states when the temperature swings at the vicinity of critical temperature for enabling the driving unit 106. The hysteresis unit 302 as an example can output a first voltage based on the temperature sensing voltage to enable the driving unit 106 when the temperature rises up to a first temperature and output a second voltage based on the temperature sensing voltage to disable the driving unit 106 when the temperature drops to a second temperature, wherein the first temperature is higher than the second temperature.

As an example, the temperature sensing unit 104 of an embodiment can include a negative temperature coefficient thermistor NTC2 and a resistor R3, wherein a terminal of the thermistor NTC2 is coupled to the operation voltage VCC. The resistor R3 is coupled between another terminal of the thermistor NTC2 and the ground. The hysteresis unit 302 can include a comparator A1 and a feedback unit 304. The comparator A1 has a positive input terminal coupled to a reference voltage Vref1, and a negative input terminal coupled to a common connection node of the thermistor NTC2 and the resistor R3. The feedback unit 304 is coupled between an output terminal and the positive terminal of the comparator A1, configured to produce a feedback voltage to the positive terminal of the comparator A1 based on a voltage at the output terminal of the comparator A1. The feedback unit 304 in the embodiment is implemented by the resistor R4.

The driving unit 106 in an embodiment can include metal-oxide-semiconductor (MOS) field effect transistor (FET) M1, coupled between the heating transistor unit 102 and the ground. A gate of the MOSFET M1 is coupled to the output terminal of the comparator A1. Further, the heating transistor unit 102 in an embodiment includes a PNP bipolar transistor Q5, of which an emitter is coupled to the operation voltage VCC. A collector of the transistor Q5 is coupled to the ground. A base of the transistor Q5 is coupled to a drain of the MOSFET M1.

In the embodiment, when the ambient temperature is getting lower, then the resistance of the thermistor NTC2 is getting greater, causing the voltage at the negative input terminal of the comparator A1 to be smaller. When the voltage at the negative input terminal of the comparator A1 is smaller than the reference voltage Vref1, the comparator A1 would output a high voltage to conduct the MOSFET M1. The MOSFET M1 as conducted can pull down the voltage at the base of the transistor Q5 and conduct the transistor Q5, so the transistor Q5 starts to generate heat and bring up the temperature of the printed circuit board. As the temperature of the transistor Q5 is gradually rising, the resistance of the thermistor NTC2 is gradually dropping, and then the voltage at the negative input terminal of the comparator A1 is gradually increasing. When the voltage at the negative input terminal of the comparator A1 is greater than the reference voltage Vref1 at the positive input terminal, the output voltage of the comparator A1 changes to a low voltage, causing the MOSFET M1 to be turned off, and further turning off the transistor Q5 to stop heating.

It is noted that, in the embodiment, the resistor R4 is configured to feedback the output voltage from the comparator A1 to the positive input terminal, so the time for the MOSFET M1 to be conducted or turned off can be delayed. For example, the MOSFET M1 is turned on when the temperature of the printed circuit board has dropped down below 6° C., causing the transistor Q5 to start heating. The MOSFET M1 is turned off when the temperature of the printed circuit board has risen up above 22° C., causing the transistor Q5 to stop heating. The delay time for the MOSFET M1 to be conducted or turned off can be adjusted by changing the resistance of the resistor R4 according to the actual need.

As known in the foregoing embodiments, the driving unit 106 is not implemented by the complicate circuit such as the micro controller or the central process unit and the low-temperature tolerance is high, so to assure that the heating control can still be precisely performed in normal operation under extremely low temperature.

Figure 4:
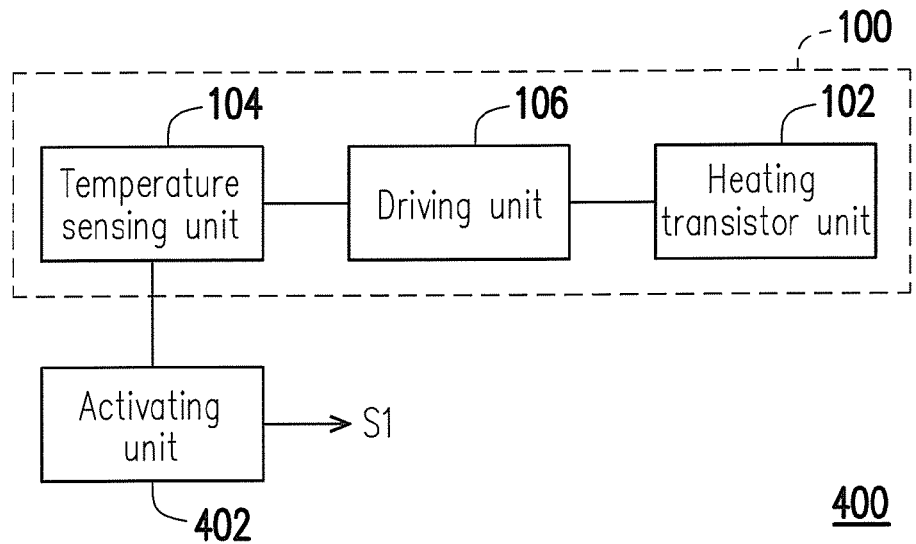
FIG. 4 is a drawing, schematically illustrating a heating device according to another embodiment of the invention.

FIG. 4 is a drawing, schematically illustrating a heating device according to another embodiment of the invention. Referring to FIG. 4, as foregoing descriptions, the heating device can be applied to an electronic apparatus, that is, the heating device can also have the function to activate the electronic apparatus to assure that the electronic apparatus can still be normally turned on and working under low temperature. As the example in an embodiment, the heating device 400 can output the activating signal S1 to activate the chip of the electronic apparatus, the central processing unit, or the micro controller, and so on. The electronic apparatus in an example can be computer, display, . . . , and so on. As shown in FIG. 4, in addition to the heating device 100 in FIG. 1, the heating device 400 in an embodiment further includes an activating unit 402, coupled to the temperature sensing unit 104. The activating unit 402 can outputs an activating signal Si based on the temperature sensing voltage when the temperature of the printed circuit board has risen up to a preset temperature.

Figure 5:
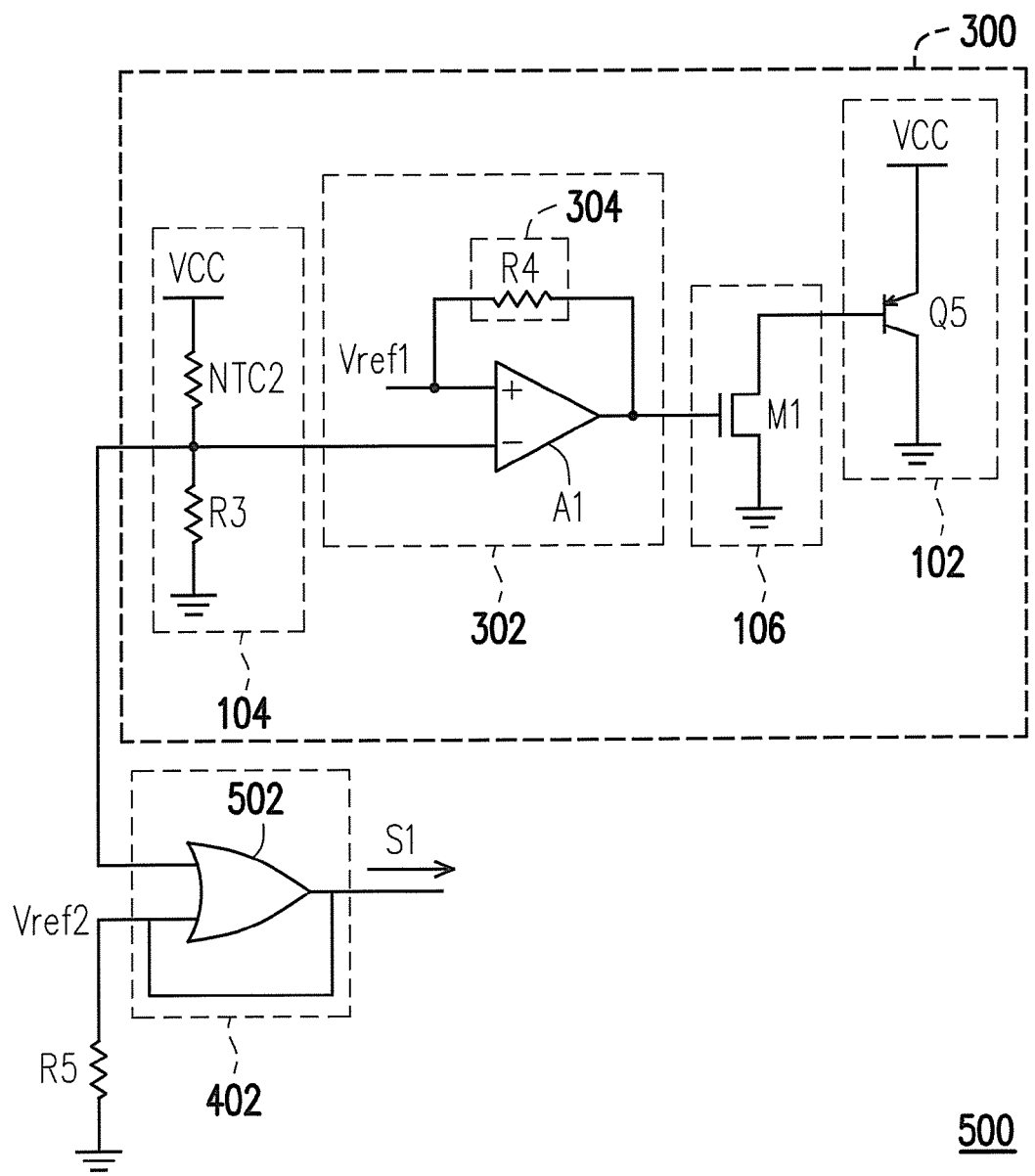
FIG. 5 is a drawing, schematically illustrating a heating device according to another embodiment of the invention.

To assure that the activation unit 402 does not output the activating signal S1 to activate the electronic apparatus when the temperature in the printed circuit board has not risen up to the preset temperature yet, the implementation of the heating device can be the one shown in FIG. 5. In FIG. 5, the heating device 500 includes the activating unit 402 and the heating device 300 as shown in FIG. 3. The activating unit 402 in an embodiment can be implemented by an OR gate 502. The first input terminal of the OR gate 502 is coupled to a common connection node of the thermistor NTC2 and the resistor R3. The second input terminal of the OR gate 502 is coupled to the output terminal of the OR gate 502 and receives the reference voltage Vref2 at a logic low level. The reference voltage Vref2 in an example can be provided by coupling the second input terminal of the OR gate 502 to the ground through the resistor R5 but this is not limited herein. When the ambient temperature is too low, which causes the voltage (i.e. the temperature sensing voltage) at the common connection node of the thermistor NTC2 and the resistor R3 to be at the logic low level, the output of the OR gate 502 is also at the logic low level. In this situation, the activating unit 402 does not output the activating signal S1.

On the other hand, the heating device 300 starts to perform heating and the temperature thereby starts to rise. The voltage at the common connection node of the thermistor NTC2 and the resistor R3 is then rising accordingly. When the voltage at the common connection node of the thermistor NTC2 and the resistor R3 has risen up to the logic high level, in which the temperature of the printed circuit board is rising up to the preset temperature at this moment, the OR gate 502 changes to output the voltage at the logic high level, in which the activating unit 402 then outputs the activating signal S1. The temperature corresponding to the condition that the activating unit 402 outputs the activating signal S1 can be set by changing the resistance of the resistor R3. As a result, the temperature sensing voltage is configured to determine whether or not to trigger the activation. This can assure that the activation unit 402 does not output the activating signal S1 to activate the electronic apparatus when the temperature has not risen up to the preset temperature yet. Further, it can avoid that the electronic apparatus is activated at the over-low temperature, resulting in the electronic apparatus being activated or operating abnormally.

It is noted that, the second input terminal and the output terminal of the OR gate 502 in the embodiment are coupled to each other. Thus, after the OR gate 502 outputs the voltage with logic high level, that is, after the activating signal S1 is outputted, the voltage at the second input terminal of the OR gate 502 is also changed to the logic high level. As a result, no matter how the voltage at the first input terminal of the OR gate is changed after then, that is, no matter how the ambient temperature is changed, the output voltage of the OR gate 502 is still keeping at the logic high level. In other words, after the electronic apparatus is activated, the heating device 500 would not be turned off due to decrease of the ambient temperature after then, and the activating state for the electronic apparatus would be continuously maintained. In other embodiment, after the electronic apparatus is activated, the heating device 500 may be configured to stop outputting the activating signal S1 when the ambient temperature drops to a value lower than the preset temperature, the coupling state between the second input terminal and the output terminal of the OR gate 502 can be removed.

As to the foregoing descriptions, the embodiments of the invention use the driving unit to drive the heating transistor unit to perform heating based on the temperature sensing voltage. Thereby, the activating unit outputs the activating signal based on the temperature sensing voltage when the sensed temperature has risen up to the preset temperature. Since the low-temperature tolerance of the driving unit is higher than that of the micro controller or the central processing unit, it can be assured that the heating device can still normally output the activating signal under extremely low temperature. In addition, the production cost of the heating device can be reduced by use of the heating transistor unit to perform heating. Further, since the heating transistor unit serving as the heating element can transmit the thermal energy to the other components through the ground surface of the printed circuit board, the heating can be performed with better efficiency and uniformity with respect to the heater board as usually used, which can only use the printed circuit board for conducting heat.

As stated at the end, it will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A heating device, comprising:
a heating transistor unit;
a temperature sensing unit, configured to sense an ambient temperature and accordingly output a temperature sensing voltage;
a driving unit, coupled to the heating transistor unit and the temperature sensing unit, configured to drive the heating transistor unit to perform heating based on the temperature sensing voltage;
an activating unit, coupled to the temperature sensing unit and configured to output an activating signal based on the temperature sensing voltage when a sensed temperature has risen to a preset temperature, wherein the heating device activates an electronic apparatus according to the activating signal; and
a hysteresis unit, coupled between the temperature sensing unit and the driving unit, wherein the hysteresis unit outputs a first voltage based on the temperature sensing voltage to enable the driving unit when the sensed temperature has risen to a first temperature, and outputs a second voltage based on the temperature sensing voltage to disable the driving unit when the sensed temperature has dropped to a second temperature, wherein the first temperature is higher than the second temperature.

2. The heating device as recited in claim 1, wherein the hysteresis unit comprises:

a comparator, having a positive input terminal coupled to a reference voltage, and a negative input terminal of the comparator coupled to the temperature sensing unit; and a feedback unit, coupled between an output terminal and the positive terminal of the comparator, configured to produce a feedback voltage to the positive terminal of the comparator based on a voltage at the output terminal of the comparator.

3. The heating device as recited in claim 1, wherein the feedback unit comprises:

a resistor, coupled between the positive terminal and the output terminal of the comparator.

4. The heating device as recited in claim 1, wherein the heating transistor unit comprises:

a first PNP bipolar transistor, having an emitter coupled to an operation voltage, a collector of the first PNP bipolar transistor being coupled to a ground, and a base of the first PNP bipolar transistor being coupled to the driving unit.

5. The heating device as recited in claim 4, wherein the heating transistor unit further comprises:

a second PNP bipolar transistor, having an emitter coupled to the collector of the first PNP bipolar transistor, wherein a base and a collector of the second PNP bipolar transistor are coupled to each other, and the collector of the second PNP bipolar transistor is coupled to the ground.

6. The heating device as recited in claim 4, wherein the driving unit comprises:

a metal-oxide-semiconductor field effect transistor, coupled between the heating transistor unit and the ground, wherein a gate of the metal-oxide-semiconductor field effect transistor is coupled to the hysteresis unit.

7. The heating device as recited in claim 4, wherein the temperature sensing unit comprises:

a negative temperature coefficient (NTC) thermistor, having a first terminal coupled to the operation voltage; and a resistor, coupled between a second terminal of the NTC thermistor and the ground.

8. The heating device as recited in claim 4, wherein the temperature sensing unit is a negative temperature coefficient (NTC) thermistor, the driving unit comprises:

a NPN bipolar transistor, wherein a collector of the NPN bipolar transistor is coupled to the base of the first PNP bipolar transistor, the NTC thermistor is coupled between a base of the NPN bipolar transistor and the ground;

a first resistor; and a second resistor, coupled in series with the first resistor between the operation voltage and the base of the NPN bipolar transistor, a common connection node of the first resistor and the second resistor is coupled to the base of the first PNP bipolar transistor.

9. The heating device as recited in claim 1, wherein the activating unit comprises:

an OR gate, having a first input terminal coupled to the temperature sensing unit, a second input terminal of the OR gate receiving a reference voltage, wherein the reference voltage is at a logic low level.

10. The heating device as recited in claim 9, wherein an output terminal of the OR gate is coupled to the second input terminal.

11. The heating device as recited in claim 9, further comprising:

a resistor, coupled between the second terminal of the OR gate and a ground.

* * * * *